(12) United States Patent
Schlipf et al.

(10) Patent No.: US 12,491,984 B2
(45) Date of Patent: Dec. 9, 2025

(54) AIRCRAFT SYSTEM

(71) Applicant: Airbus Operations GmbH, Hamburg (DE)

(72) Inventors: Bernhard Schlipf, Hamburg (DE); Dennis Krey, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1 day.

(21) Appl. No.: 18/624,519

(22) Filed: Apr. 2, 2024

(65) Prior Publication Data

US 2024/0343381 A1 Oct. 17, 2024

(30) Foreign Application Priority Data

Apr. 11, 2023 (EP) .................................... 23167407

(51) Int. Cl.
*B64C 9/02* (2006.01)
*B64C 9/18* (2006.01)

(52) U.S. Cl.
CPC . *B64C 9/02* (2013.01); *B64C 9/18* (2013.01)

(58) Field of Classification Search
CPC ................ B64C 9/02; B64C 9/16; B64C 9/18
See application file for complete search history.

(56) References Cited

U.S. PATENT DOCUMENTS

| | | | | |
|---|---|---|---|---|
| 2,614,774 A | * | 10/1952 | Donovan | B64C 9/16 244/216 |
| 4,283,029 A | * | 8/1981 | Rudolph | B64C 9/18 244/215 |
| 4,381,093 A | * | 4/1983 | Rudolph | B64C 9/16 244/219 |
| 4,447,028 A | * | 5/1984 | Wang | B64C 9/00 244/215 |
| 5,344,103 A | | 9/1994 | Fitzgibbon et al. | |
| 5,966,997 A | * | 10/1999 | Halm | B64C 9/18 74/44 |

(Continued)

OTHER PUBLICATIONS

Extended European Search Report including Written Opinion for Application No. 23167407.8 dated Sep. 13, 2023, pp. 1-8.

*Primary Examiner* — Joshua J Michener
*Assistant Examiner* — Michael B. Kreiner
(74) *Attorney, Agent, or Firm* — Lerner David LLP

(57) ABSTRACT

An aircraft system includes a support structure, an aerodynamic component, a first coupling unit and a second coupling unit. The first coupling unit includes a first coupling mechanism movably coupling the aerodynamic component to a first coupling point at the support structure, and a second coupling mechanism coupling the aerodynamic component to a second coupling point at the support structure. The first and second coupling points are spatially separated from each other, wherein the first coupling mechanism and the second coupling mechanism interact with each other to enable a rotational movement of the aerodynamic component with respect to the support structure such that, during the rotational movement of the aerodynamic component, a center of rotation of the aerodynamic component is translated from a neutral position to an adjusted position. The second coupling unit pivotably moves the aerodynamic component about a pivot axis at the support structure.

14 Claims, 2 Drawing Sheets

(56) References Cited

U.S. PATENT DOCUMENTS

| | | | | |
|---|---|---|---|---|
| 6,076,775 | A * | 6/2000 | Bauer | B64C 9/18 244/215 |
| 6,869,050 | B1 * | 3/2005 | Burchard | B64C 9/00 244/215 |
| 7,293,744 | B2 * | 11/2007 | Perez-Sanchez | B64C 9/22 244/211 |
| 7,798,450 | B2 * | 9/2010 | Patzelt | B64C 9/18 244/211 |
| 8,302,913 | B2 * | 11/2012 | Schlipf | B64C 9/16 244/215 |
| 8,393,799 | B2 * | 3/2013 | Dahl | F16C 19/46 384/569 |
| 8,398,019 | B2 * | 3/2013 | Schlipf | B64C 13/28 244/99.2 |
| 9,004,405 | B2 * | 4/2015 | Goettinger | B29C 70/48 244/123.1 |
| 9,108,724 | B2 * | 8/2015 | Rechsiek | B64D 45/0005 |
| 9,315,256 | B2 | 4/2016 | Maenz | |
| 9,751,615 | B2 * | 9/2017 | Recksiek | B64C 9/22 |
| 10,899,431 | B2 * | 1/2021 | Lorenz | B64C 13/40 |
| 11,034,432 | B2 * | 6/2021 | Tsai | F16H 25/2204 |
| 11,136,111 | B2 * | 10/2021 | Schlipf | B64C 13/28 |
| 11,208,199 | B2 * | 12/2021 | Tfaily | B64C 7/00 |
| 11,312,474 | B2 * | 4/2022 | Tsai | B64C 9/18 |
| 2020/0130809 | A1 * | 4/2020 | Tsai | B64C 5/10 |

* cited by examiner

AIRCRAFT SYSTEM

FIELD OF THE INVENTION

The invention generally relates to coupling systems for aircraft movables. In particular, the invention relates to an aircraft system and an aircraft comprising such an aircraft system.

BACKGROUND OF THE INVENTION

Usually, aircraft systems are subject to strong aerodynamic loads, especially aircraft systems being directly exposed to the airflow surrounding the aircraft. In particular, movables like flap components for aircraft are usually exposed to strong aerodynamic loads during the operation of the aircraft. For example, flap components are attached at a trailing edge region of an aircraft wing and provide specified cruise and high-lift configurations, wherein the flap components are adapted to be retracted and deployed depending on the current flight condition. In certain configurations, high bending forces or high internal tension forces may occur within the aircraft system, e.g., the aircraft movable. In consequence, high forces may also occur within the coupling mechanisms that couple the aircraft movables to the aircraft support structure. Therefore, aircraft systems or aircraft movables are usually designed to efficiently transfer loads into a support structure of the aircraft, thereby reducing internal bending or tension forces. There exist different approaches that can be used to distribute the loads within the aircraft systems or aircraft movables.

US 2012/0 211 604 A1 and DE 10 2009 037 707 A1 describe an adjustment mechanism of an adjustment device for coupling an adjustment flap to a main wing of an aerofoil and for adjusting the adjustment flap.

BRIEF SUMMARY OF THE INVENTION

An aspect of the invention relates to reducing bending forces or tension forces within an aircraft system.

According to an aspect of the invention, an aircraft system is provided. The aircraft system comprises a support structure. The aircraft system further comprises an aerodynamic component, a first coupling unit and a second coupling unit. The first coupling unit and the second coupling unit movably couple the aerodynamic component to the support structure. The first coupling unit comprises a first coupling mechanism which couples the aerodynamic component to a first coupling point at the support structure and a second coupling mechanism which couples the aerodynamic component to a second coupling point at the support structure. The first coupling point is spatially separated from the second coupling point. The first coupling mechanism and the second coupling mechanism may be configured to interact with each other in order to enable a rotational movement of the aerodynamic component with respect to the support structure such that, during the rotational movement of the aerodynamic component, a center of rotation (CoR) of the aerodynamic component is translated, e.g., shifted, from a neutral position to an adjusted position. The second coupling unit is configured to pivotably move the aerodynamic component about a pivot axis, e.g., a fixed pivot axis, at the support structure.

The inventive aircraft system provides an approach to decouple the aerodynamic component from bending effects in the support structure. In particular, the aerodynamic component can be decoupled in its chordwise direction from said bending effects by providing first and second coupling mechanisms being kinematically decoupled from each other, i.e., being not directly coupled to each other via a linkage, within the first coupling unit.

For example, the support structure and the aerodynamic component can be stiff elements which are connected to each other via coupling mechanisms at various connection regions. If a bending occurs inside one of the support structure or the aerodynamic component, then the bending amount will likely not be the same in the other of the support structure or the aerodynamic component so that high loads and forces will occur inside the support structure and the aerodynamic component, and especially inside the different coupling units that couple the aerodynamic component to the support structure. However, the inventive aircraft system now provides an approach to reduce the loads inside the respective coupling units by the above-mentioned chordwise decoupling of the aerodynamic component from the support structure.

Although this inventive decoupling principle will be described with focus on a trailing edge movable attached to a wing structure of an aircraft, it should be understood that the decoupling principle can be applied to other aircraft systems as well, like for example coupling units between vertical stabilizers and rudders or coupling units between horizontal stabilizers and elevators.

In an example, the support structure defines a wing structure which may be seen as the base system to which the aerodynamic component is movably coupled. The wing structure has a skin section with an aerodynamic outer surface. In particular, the wing structure has an aerodynamic upper surface and an aerodynamic lower surface. The upper and lower surfaces may be connected to each other via a leading edge at the front of the wing structure and via a trailing edge at the rear of the wing structure. The aerodynamic component may be a flap component, e.g., a flap or part of a flap, and may be arranged at the rear of the wing structure. Multiple of these aerodynamic components may together form a trailing edge unit. For example, multiple aerodynamic components are arranged next to each other along a spanwise extension direction of the wing structure. However, multiple aerodynamic components may also be arranged next to each other along a chordwise extension direction of the wing structure, wherein the aerodynamic components provide a series of aerodynamic components coupled to each other.

The aerodynamic component may be coupled to the support structure by a plurality of further coupling units in addition to the above-mentioned first and second coupling units, as will be described in more detail below. In a preferred embodiment, at least one further coupling unit is provided in addition to the above-mentioned first and second coupling units, wherein all coupling units movably couple the aerodynamic component to the support structure.

The first coupling unit of the aircraft system may be divided into two coupling mechanisms, i.e., the first coupling mechanism and the second coupling mechanism, which preferably might not be directly coupled to each other. In this manner, it is possible that the loads in the aerodynamic component can be transferred into two different points, i.e., the first coupling point and the second coupling point of the support structure, which provides two separate load paths into the support structure via the first coupling unit, thereby reducing the loads inside the first coupling unit. The provision of two separate coupling mechanisms in the form of a linkage mechanism thus allows for a chordwise decoupling of the aerodynamic component from the support structure during a rotational movement of the aerodynamic component with respect to the support structure, i.e., during a change of bending forces within either of these components.

The first coupling mechanism may include one or more linkages, for example rods or bars, which provide a kinematic arrangement that is configured to enable a translational movement, a rotational movement or a combined translational and rotational movement of the aerodynamic component relative to the support structure. Similarly, the second coupling mechanism may also include one or more linkages, for example rods or bars, which provide a kinematic arrangement that is configured to enable a translational movement, a rotational movement or a combined translational and rotational movement of the aerodynamic component relative to the support structure.

In an example, only the first coupling mechanism is directly coupled to a drive unit such that the movement of the aerodynamic component relative to the support structure is initiated via the first coupling mechanism, while the second coupling mechanism is not directly coupled to the drive unit. The drive unit may be connected to the first coupling mechanism via a connecting element or linkage, e.g., a rod or bar, to the first coupling mechanism, for example in a region between the aerodynamic component and the support structure.

The first and the second coupling mechanism may interact with one another to enable a rotational movement of the aerodynamic component with respect to the support structure such that, during the rotational movement of the aerodynamic component with respect to the support structure, a center of rotation of the aerodynamic component is shifted from a neutral position to an adjusted position. That is, the second coupling mechanism, which may be a rear linkage of the aerodynamic component, may be positioned and designed in a way that it moves the center of rotation at the support structure from the neutral position to the adjusted position.

The neutral position may represent a so-called "in-jig"-hingeline which may be understood as an ideal pivotal axis about which the aerodynamic component rotates with respect to the support structure if no bending forces occur within the components of the aircraft system. In other words, the neutral position may define a pivotal axis about which the aerodynamic component would rotate with respect to the support structure in an unloaded state of the aerodynamic component and/or the support structure.

The adjusted position may represent a so-called "bent-flight"-hingeline which may be understood as a shifted pivotal axis about which the aerodynamic component rotates with respect to the support structure if bending forces occur within the components of the aircraft system. In other words, the adjusted position may define a shifted pivotal axis about which the aerodynamic component would rotate with respect to the support structure in a loaded state of the aerodynamic component and/or the support structure.

Consequently, the first coupling unit including the first and second coupling mechanisms provides an n-bar linkage, for example a four-bar linkage or four-bar linkage coupling unit, which enables a decoupling of a stiff axis of the aerodynamic component from bending effects on the hingeline at the support structure, where the linkage is installed.

The second coupling unit may be limited to a strict pivotal movement of the aerodynamic component with respect to the pivot axis. In particular, the aerodynamic component may not be decoupled in its chordwise direction at the location of the second coupling unit, while it may be decoupled in its chordwise direction at the location of the first coupling unit as described above.

According to an embodiment, the first coupling mechanism is rotatably coupled to the support structure via the first coupling point.

A rotary bearing can be located at the support structure about which the first coupling mechanism can be rotated with respect to the support structure. However, as indicated above, this does not necessarily mean that the first coupling point is a fixed center of rotation of the aerodynamic component. Rather, the center of rotation may change during the rotational movement of the aerodynamic component.

According to an embodiment, the second coupling mechanism is rotatably coupled to the support structure via the second coupling point.

Again, a rotary bearing can be located at the support structure about which the second coupling mechanism can be rotated with respect to the support structure. Again, this does not necessarily mean that the second coupling point is a fixed center of rotation of the aerodynamic component.

In order to take spanwise loads, the first coupling point may be split into two or more separate coupling points being arranged along a transverse direction that is substantially perpendicular to the deployment direction of the aerodynamic component. Alternatively or additionally, the second coupling point may be split into two or more separate coupling points being arranged along a transverse direction that is substantially perpendicular to the deployment direction of the aerodynamic component. Such a configuration may resemble an A-link structure that can take the side loads, i.e., loads in a spanwise extension direction of the support structure.

According to an embodiment, the first coupling point is fixedly arranged at the support structure.

The first coupling point may be a bearing element or hinge element which is configured to rotatably attach one end of the first coupling mechanism to the support structure. This bearing element or hinge element may be fixedly arranged with respect to the support structure, for example a wing structure of the aircraft.

According to an embodiment, the first coupling point and the second coupling point are configured to move relative to each other according to a shifting movement on the support structure, the shifting movement being defined by a reversible structural deformation within the support structure.

That is, the support structure may be subject to an internal bending which deforms the support structure, for example the wing structure. As the first coupling point is separated to the second coupling point, for example via a predefined distance in an unbent state of the support structure, the bending effects inside the support structure and the corresponding deformation might lead to a shifting or displacement of the first coupling point relative to the second coupling point such that there is a new distance between the first coupling point and the second coupling point which deviates from the predefined distance between the two coupling points in the unbent state.

It is noted that a similar bending may also occur inside the aerodynamic component. However, a bending of the aerodynamic component may be different compared to a bending of the support structure since the aerodynamic loads are usually different on both components and may vary depending on the operational configuration of the aircraft system. Due to the above-explained decoupling capability of the first coupling unit, the loads occurring as a result of the different bending forces among the components may be reduced and at least partially or fully compensated.

According to an embodiment, the second coupling point is fixedly arranged at the support structure.

The second coupling point may be a bearing element or hinge element which is configured to rotatably attach one end of the second coupling mechanism to the support structure. This bearing element or hinge element may be fixedly arranged with respect to the support structure, for example a wing structure of the aircraft.

According to an embodiment, the second coupling point is movably arranged at the support structure such that a distance between the first coupling point and the second coupling point is variable.

In case of a movable arrangement of the second coupling point on the support structure, the second coupling point by be shifted or displaced, e.g., slid, on the support structure. A respective sliding mechanism may be integrated into the support structure along which the second coupling point can slide on the support structure.

In an example, the first coupling mechanism is coupled to the aerodynamic component via a third coupling point at the aerodynamic component and the second coupling mechanism is coupled to the aerodynamic component via a fourth coupling point at the aerodynamic component.

The third coupling point may be a bearing element or hinge element which is configured to rotatably attach another end of the first coupling mechanism to the aerodynamic component. This bearing element or hinge element may be fixedly arranged at the aerodynamic component, for example a flap component of the aircraft. Analogously, the fourth coupling point may be a bearing element or hinge element which is configured to rotatably attach another end of the second coupling mechanism to the aerodynamic component. This bearing element or hinge element may be fixedly arranged at the aerodynamic component, for example a flap component of the aircraft.

In order to take spanwise loads, the third coupling point may be split into two or more separate coupling points being arranged along a transverse direction that is substantially perpendicular to the deployment direction of the aerodynamic component. Alternatively or additionally, the fourth coupling point may be split into two or more separate coupling points being arranged along a transverse direction that is substantially perpendicular to the deployment direction of the aerodynamic component. Such a configuration may resemble an A-link structure that can take the side loads, i.e., loads in a spanwise extension direction of the support structure.

According to an embodiment, the first coupling mechanism is not directly coupled to the second coupling mechanism.

In particular, there may be no direct linkages, e.g., rods or bars, which directly couple the first coupling mechanism to the second coupling mechanism. That is, the first coupling mechanism may include only a linkage which connects the third coupling point at the aerodynamic component to the first coupling point at the support structure, and possibly an additional linkage to a drive unit. Accordingly, the second coupling mechanism may include only a linkage which connects the fourth coupling point at the aerodynamic component to the second coupling point at the support structure. No further direct links, connections or interfaces may be present to couple the first coupling mechanism to the second coupling mechanism, i.e., in a region between the aerodynamic component and the support structure.

According to an embodiment, the aircraft system further comprises a drive unit configured to drive the first coupling mechanism, thereby enabling the movement of the aerodynamic component relative to the support structure.

The drive unit may be directly coupled to the first coupling mechanism via a linkage, e.g., via a bar or a rod.

According to an embodiment, the first coupling unit and the second coupling unit are spaced apart from each other in a spanwise extension direction of the aerodynamic component.

The spanwise extension direction of the aerodynamic component may be a direction which is substantially perpendicular to a chordwise extension direction of the aerodynamic component. In an example, the first coupling unit and the second coupling unit independently couple the aerodynamic component to the support structure at different locations in the spanwise extension direction of the aerodynamic component.

According to an embodiment, the pivotal movement of the aerodynamic component about the pivot axis at the support structure may be a pure or strict pivotal movement, i.e., a pivotal movement with no translational movement component.

According to an embodiment, the aerodynamic component has an airfoil-like cross sectional shape with a chordwise extension direction, wherein the first coupling mechanism is arranged in front of the second coupling mechanism with respect to the chordwise extension direction.

The chordwise extension direction may define an imaginary line between a leading edge of the aerodynamic component and a trailing edge of the aerodynamic component. The two coupling mechanisms may be arranged one after in the chordwise extension direction. Accordingly, the inventive aircraft system may provide for a decoupling of the two coupling mechanisms in the chordwise extension direction. However, it should be understood that small deviations or offsets in the arrangement of the two coupling mechanisms in a spanwise direction of the aerodynamic component, i.e., a direction substantially perpendicular to the chordwise direction, are possible.

According to an embodiment, the support structure is a part of a wing structure of an aircraft, and the aerodynamic component is a trailing edge movable of the aircraft.

The support structure may thus be a support structure of an aircraft wing and the aerodynamic component may be a flap that is coupled to this wing support structure. However, as described above, it is possible that the inventive decoupling principle may be applied to other aerodynamic systems of aircraft, like for example tailplanes of aircraft, leading edge devices of aircraft, etc.

According to an aspect, an aircraft is provided. The aircraft comprises a wing structure and the aircraft system as described herein. The wing structure comprises the support structure to which the aerodynamic component is movably coupled via the first coupling unit and the second coupling unit. The aircraft comprises at least one further coupling unit which movably couples the aerodynamic component to the support structure.

For example, exactly one, exactly two, exactly three, exactly four, exactly five, or more further coupling units may be present to couple the aerodynamic component to the support structure of the aircraft system, e.g., at different locations in the spanwise extension direction of the aerodynamic component.

The first coupling unit may herein also be referred to as four-bar linkage coupling unit as described above. The second coupling unit may herein also be referred to as a pivotal coupling unit since, as described above, the second coupling unit may provide a pure or strict pivot movement of the aerodynamic component with respect to the support structure. Different configurations as to the arrangement of four-bar linkage coupling units and pivotal coupling units may be possible to movably couple the aerodynamic component to the support structure.

An exemplary configuration with three coupling units may include a subsequent arrangement of one pivotal coupling unit, one four-bar linkage coupling unit and one pivotal coupling unit in the spanwise extension direction.

Another exemplary configuration with three coupling units may include a subsequent arrangement of one four-bar linkage coupling unit, one pivotal coupling unit and one four-bar linkage coupling unit in the spanwise extension direction.

An exemplary configuration with four coupling units may include a subsequent arrangement of one pivotal coupling unit, one four-bar linkage coupling unit, one four-bar linkage coupling unit and one pivotal coupling unit in the spanwise extension direction.

Another exemplary configuration with four coupling units may include a subsequent arrangement of one four-bar linkage coupling unit, one pivotal coupling unit, one pivotal coupling unit and one four-bar linkage coupling unit in the spanwise extension direction.

The drive unit may be coupled to one or more of the coupling units. For example, only one coupling unit, i.e., either a pivotal coupling unit or a four-bar linkage coupling unit may be driven by the drive unit. Alternatively, two coupling units may be driven by the drive unit or separate drive units. Alternatively, three coupling units may be driven by the drive unit or separate drive units. In a further alternative, four coupling units may be driven by the drive unit or separate drive units.

According to an embodiment, the aerodynamic component is a flap component having a spanwise extension direction, wherein the first coupling unit, e.g., the four-bar linkage coupling unit, is arranged between the second coupling unit, e.g., the pivot coupling unit, and the at least one further coupling unit with respect to the spanwise extension direction.

For example, in case of exactly one further coupling unit, the first coupling unit of the aircraft system is arranged between the second coupling unit and the one further coupling unit. In summary, the same aerodynamic component can thus be coupled via three separate coupling units to the support structure. The first coupling unit in the middle thus provides the above-explained decoupling capabilities, while the two further coupling units may not necessarily provide such decoupling capabilities and may thus comprise a conventional coupling design like a pivot coupling.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
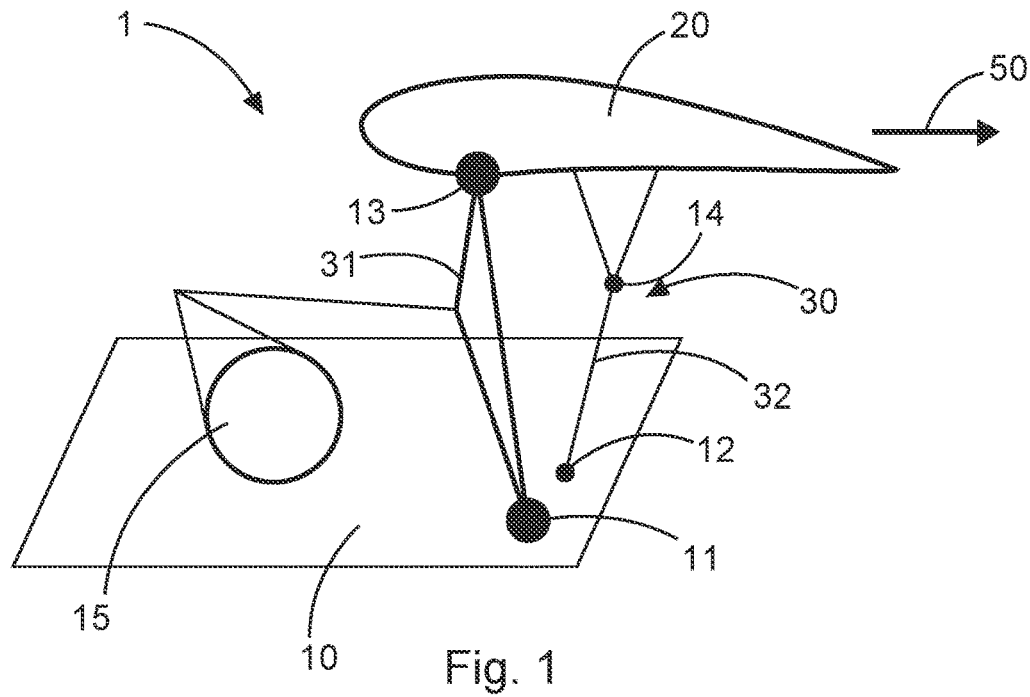
FIG. 1 shows an aerodynamic component which is coupled to a support structure via a first coupling unit.

The representations and illustrations in the drawings are schematic and not to scale. A better understanding of the system described above may be obtained through a review of the illustrations accompanying this application together with a review of the detailed description that follows.

FIG. 1 shows a part of an aircraft system 1 in which an aerodynamic component 20 is movably coupled to a support structure 10. The aircraft system 1 thus comprises the support structure 10, for example in the form of a wing structure of an aircraft, and the aerodynamic component 20, for example in the form of a flap component at a trailing edge region of the aircraft wing structure. A drive unit 15 may be integrated into or attached to the support structure 10 and is configured to provide a drive power to drive, e.g., to move, the aerodynamic component 20 relative to the support structure 10. The drive unit 15 may be present in the form of an actuation mechanism that initiates the movement of the aerodynamic component 20 via a linkage, e.g., including a rod or a bar, that couples the actuation mechanism with a first coupling unit 30 of the aerodynamic system 1. In particular, the first coupling unit 30 comprises a first coupling mechanism 31 and a second coupling mechanism, wherein both coupling mechanisms couple the aerodynamic component 20 to the support structure 10. The first coupling mechanism 31 couples the aerodynamic component 20 to a first coupling point 11, for example a hinge or bearing element, at the support structure 10 and the second coupling mechanism 32 couples the aerodynamic component 20 to a second coupling point 12, for example a hinge or bearing element, at the support structure 10. The first coupling point 11 is spatially separated from the second coupling point 12, i.e., the first coupling point 11 does not coincide with the second coupling point 12. In other words, the first coupling point 11 and the second coupling point 12 are positioned at different locations on the support structure 10.

As can be seen in FIG. 1, the aerodynamic component 20 has an airfoil-like cross sectional shape with a chordwise extension direction 50. The first coupling mechanism 31 is arranged in front of the second coupling mechanism 32 with respect to the chordwise direction 50. Accordingly, the first coupling mechanism 31 may be denoted as front linkage and the second coupling mechanism 32 may be denoted as rear linkage. In the example shown in FIG. 1, the drive unit 15 is directly coupled to the first coupling mechanism 31 to provide the drive power to the first coupling mechanism 31, thereby enabling the movement of the aerodynamic component 20 relative to the support structure 10. It is noted that, in this example, the second coupling mechanism 32 that couples the aerodynamic component 20 to the second coupling point 12 on the support structure 10 is not directly coupled to the drive unit 15.

The first coupling mechanism 31 is coupled to the aerodynamic component 20 via a third coupling point 13 on the aerodynamic component 20 and the second coupling mechanism 32 is coupled to the aerodynamic component 20 via a fourth coupling point 14 at the aerodynamic component 20. The third coupling point 13 is spatially separated from the fourth coupling point 14, i.e., the third coupling point 13 does not coincide with the fourth coupling point 14. In other words, the third coupling point 13 and the fourth coupling point 14 are positioned at different locations on the aerodynamic component 20.

Each of the first, second, third and fourth coupling points 11, 12, 13, 14 may constitute rotational couplings, for example including hinge elements or bearing elements, which allow a rotational movement of the first and second coupling mechanisms 31, 32 relative to the adjacent components, i.e., relative to the support structure 10 on the one hand and relative to the aerodynamic component 20 on the other.

The above-described configuration of the first coupling unit 30 constitutes an approach to decouple the aerodynamic component 20 in the chordwise direction 50 from the support structure 10 using a specified linkage mechanism instead of coupling mechanisms like for example so-called H-Links.

Figure 2:
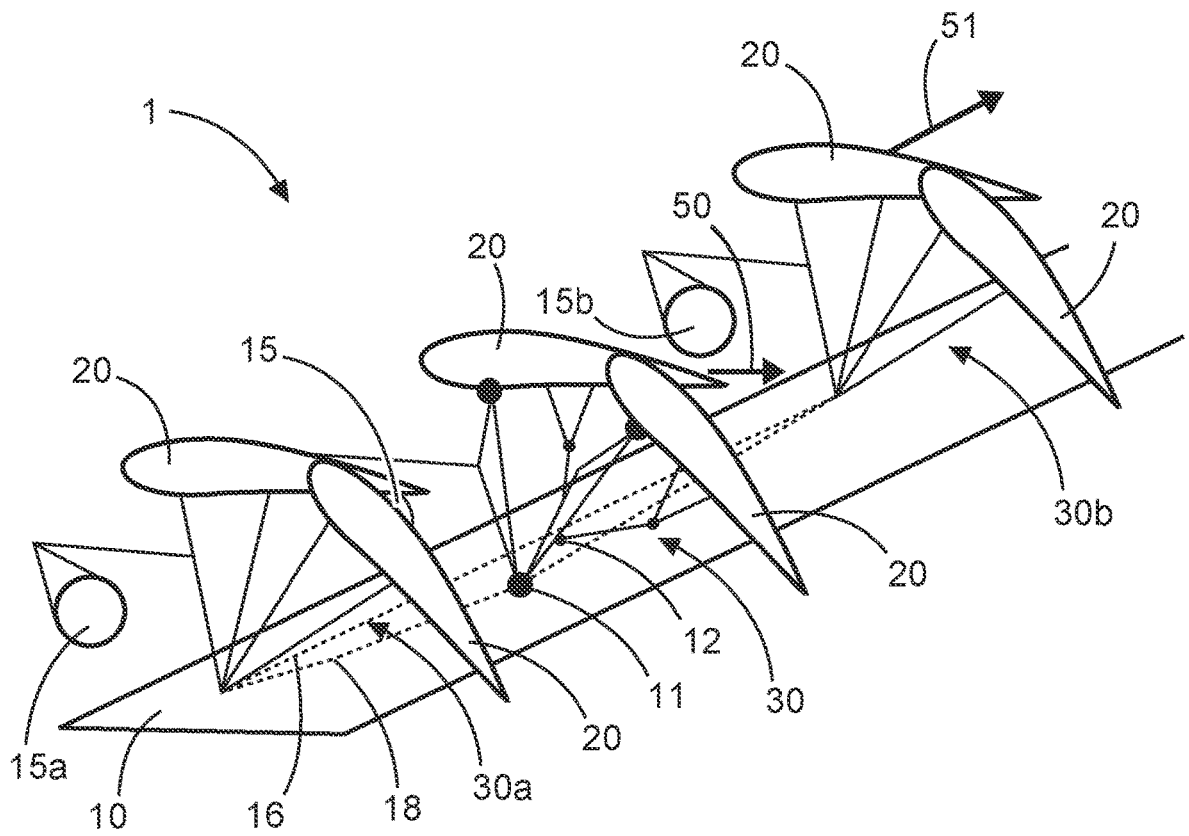
FIG. 2 shows the first coupling unit of FIG. 1 and two further coupling units arranged along a spanwise extension direction.

FIG. 2 shows the part of the aircraft system 1 of FIG. 1 with, in addition to the first coupling unit 30, two further coupling units 30a, 30b arranged along a spanwise extension direction 51 of the aircraft system 1, wherein the further coupling units 30a, 30b are driven by the further drive units 15a and 15b, respectively. The spanwise extension direction 51 may be a spanwise extension direction 51 of the support structure 10, e.g., the wing structure, and/or a spanwise extension direction 51 of the aerodynamic component 20, e.g., the flap component. Each of the three coupling units 30, 30a, 30b is shown in a retracted configuration (left depictions in which the chordwise direction 50 of each aerodynamic component 20 extends substantially horizontally) and a deployed configuration (right depictions in which the aerodynamic components 20 are in a tilted orientation). It is noted that the first coupling unit 30 is arranged between the two further coupling units 30a and 30b along the spanwise direction 51. The following explanations with regard to the inventive decoupling principle are limited to the first coupling unit 30 which is arranged between the two further coupling units 30a and 30b.

The first coupling mechanism 31 and the second coupling mechanism 32 of the first coupling unit 30 are configured to interact with each other in order to enable a rotational movement of the aerodynamic component 20 with respect to the support structure 10, i.e., from the retracted configuration to the deployed or tilted configuration.

The rotational movement is carried out such that, during the rotational movement of the aerodynamic component 20, and thus during a change of the aerodynamic forces and corresponding bending effects in the support structure 10 and/or the aerodynamic component 20 during operation of the aircraft system 1, a center of rotation of the aerodynamic component 20 is shifted from a neutral position to an adjusted position. This behavior may be limited to the location of the first coupling unit 30.

The neutral position may define a rotational axis, e.g., a so-called "in-jig"-hingeline 16, about which the aerodynamic component 20 rotates with respect to the support structure 10 in an unloaded state of the aerodynamic component 20 and/or the support structure 10. However, during the deployment of the aerodynamic component 20 with respect to the support structure 10, internal forces, e.g., bending forces, within the aerodynamic component 20 and/or the support structure 10 may change considerably. The adjusted position may thus define a shifted rotational axis, e.g., a so-called "bent-flight"-hingeline 18, about which the aerodynamic component 20 rotates with respect to the support structure 10 when the bending forces change within the aerodynamic component 20 and/or the support structure 10. In other words, the adjusted position may define a shifted rotational axis about which the aerodynamic component 20 would rotate with respect to the support structure 10 in a loaded state of the aerodynamic component 20 and/or the support structure 10.

The decoupling principle due to the specific configuration of the first coupling unit 30, in particular, the provision of the independent coupling mechanisms 31 and 32, allows the center of rotation of the aerodynamic component 20 to move from close to the "in-jig"-hingeline 16 to the "bent-flight"-hingeline 18 during the rotational movement or tilting of the aerodynamic component 20 from the retracted configuration to the deployed configuration. In other words, a self-aligning mechanism which aligns the center of rotation to the "bent-flight"-hingeline 18 can be provided by the first coupling unit 30. Thus, the "in-jig"-hingeline 16 may represent an initial hinge axis in the region of the support structure and the "bent-flight"-hingeline 18 may represent a shifted hinge axis in the region of the support structure.

In this manner, the aerodynamic component 20 can be decoupled in its chordwise direction 50, which reduces reaction forces due to a support structure bending, e.g., wing bending. This decoupling of the stiff axis reduces the interface loads as well as torsions within the first coupling unit 30, within the coupling points 11, 12, 13, 14, within the support structure 10 and/or within the aerodynamic component 20. The decoupling principle also ensures the coupling mechanism 30 to be moved with less drive power, i.e., less force, to overcome the resistance of a non-decoupled system.

Figure 3:
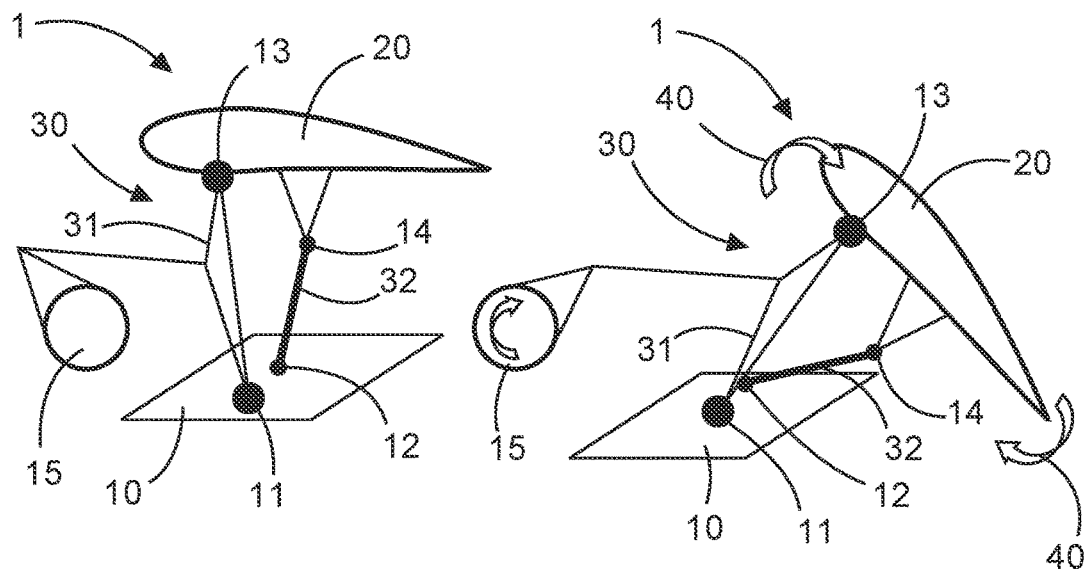
FIG. 3 shows the first coupling unit of FIGS. 1 and 2 in a retracted configuration and in a deployed configuration.

FIG. 3 shows the part of the aircraft system 1 of FIGS. 1 and 2, with the first coupling unit 30 in the retracted configuration (left illustration) and in the deployed configuration (right illustration). With regard to the individual numbered components in FIG. 3, it is referred to the explanations with respect to FIGS. 1 and 2 above. FIG. 3 provides a visualization of the interaction between the rotation of the first coupling unit 30 around the hingeline at the first coupling point 11, i.e., the hinge point 11, and the tilting of the second coupling mechanism 32, i.e., the rear link. As can be seen from FIG. 3, the linkages of the first coupling mechanism 31 may independently move with respect to the first coupling mechanism 32 as both coupling mechanisms 31, 32 are attached to the support structure 10 via spatially separated coupling points 11, 12 and as both coupling mechanisms 31, 32 are not directly coupled to each other via any linkage therebetween. In particular, the first coupling mechanism 31 and the second coupling mechanism 32 enable the rotational movement 40 of the aerodynamic component 20 with respect to the support structure 10 such that, during the rotational movement 40 of the aerodynamic component 20, a center of rotation of the aerodynamic component 20 is shifted from the neutral position to the adjusted position (cf. FIG. 2 above).

Figure 4:
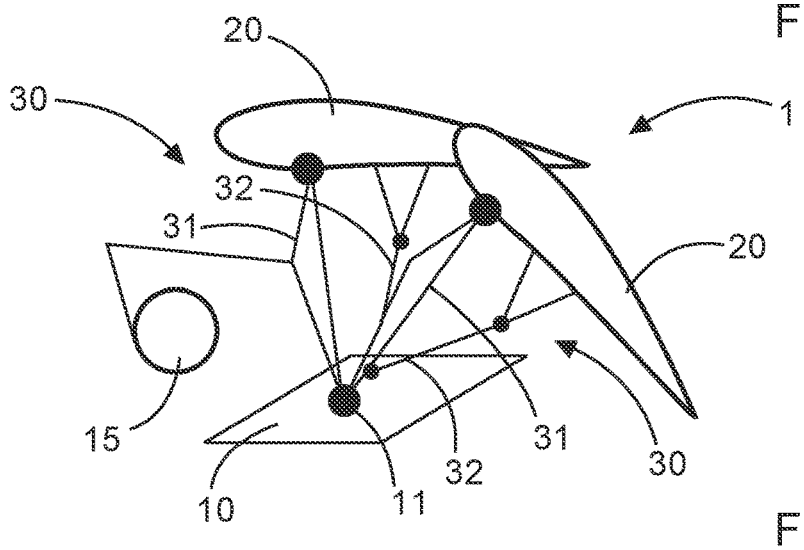
FIG. 4 shows the first coupling unit of FIGS. 1 to 3 depicting the retracted configuration overlayed with the deployed configuration.

FIG. 4 now shows the part of the aircraft system 1 of FIGS. 1 to 3 depicting the retracted configuration superimposed with the deployed configuration of the aerodynamic component 20. With regard to the individual numbered components in FIG. 4, it is referred to the explanations with respect to FIGS. 1 to 3 above. As can be seen from FIG. 4, the deployed configuration comprises a configuration of the aerodynamic component 20 in which the aerodynamic component 20 and the first coupling unit 30 are tilted with respect to the retracted configuration.

Figure 5:
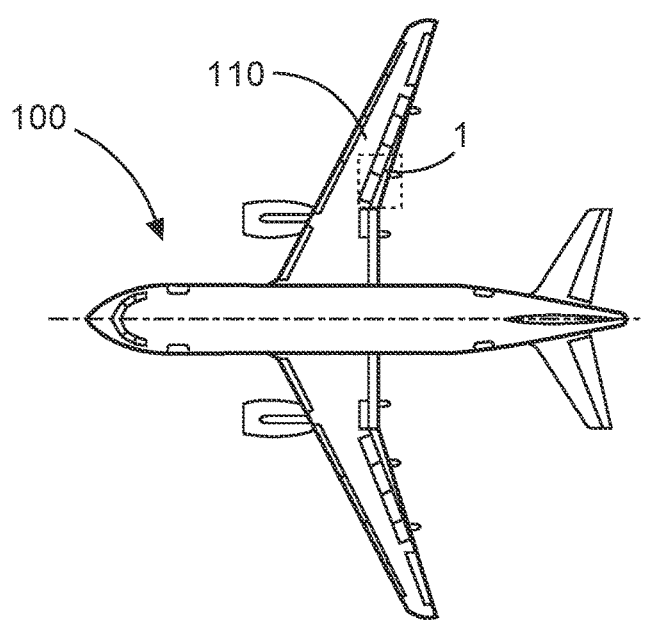
FIG. 5 shows an aircraft comprising an aircraft system having the first coupling unit of FIGS. 1 to 4.

FIG. 5 shows an aircraft 100 comprising the part of the aircraft system 1 of FIGS. 1 to 4. The aircraft 100 comprises a wing structure 110 and the aircraft system 1 as described with respect to FIGS. 1 to 4 above to which reference is made. The wing structure 110 comprises the support structure 10 to which the aerodynamic component 20 is movably coupled via the first coupling unit 30 (cf. e.g., FIG. 1). At least two further coupling units 30a, 30b, in addition to the first coupling unit 30, movably couple the aerodynamic component 20 to the support structure 10 (cf. FIG. 2). In this example, the aerodynamic component 20 is a flap component at a trailing edge section of the wing structure 110 of the aircraft 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft system, comprising:
a support structure;
an aerodynamic component; and
a first coupling unit and a second coupling unit;
wherein the first coupling unit and the second coupling unit movably couple the aerodynamic component to the support structure;
wherein the first coupling unit comprises a first coupling mechanism coupling the aerodynamic component to a first coupling point at the support structure;
wherein the first coupling unit comprises a second coupling mechanism coupling the aerodynamic component to a second coupling point at the support structure;
wherein the first coupling point is spatially separated from the second coupling point;
wherein the first coupling mechanism and the second coupling mechanism are configured to interact with each other in order to enable a rotational movement of the aerodynamic component with respect to the support structure such that, during the rotational movement of the aerodynamic component, a center of rotation of the aerodynamic component is translated from a neutral position to an adjusted position;
wherein the second coupling unit is configured to pivotably move the aerodynamic component about a pivot axis at the support structure, and
wherein the second coupling unit is configured to pivotably move the aerodynamic component about the pivot axis at the support structure in accordance with a pure pivotal movement.

2. The aircraft system according to claim 1,
wherein the first coupling mechanism is rotatably coupled to the support structure via the first coupling point.

3. The aircraft system according to claim 1,
wherein the second coupling mechanism is rotatably coupled to the support structure via the second coupling point.

4. The aircraft system according to claim 1,
wherein the first coupling point is fixedly arranged at the support structure.

5. The aircraft system according to claim 1,
wherein the first coupling point and the second coupling point are configured to move relative to each other according to a shifting movement on the support structure, the shifting movement defined by a reversible structural deformation within the support structure.

6. The aircraft system according to claim 1,
wherein the second coupling point is fixedly arranged at the support structure.

7. The aircraft system) according to claim 1,
wherein the second coupling point is movably arranged at the support structure such that a distance between the first coupling point and the second coupling point is variable.

8. The aircraft system according to claim 1,
wherein the first coupling mechanism is not directly coupled to the second coupling mechanism.

9. The aircraft system according to claim 1, further comprising:
a drive unit configured to drive the first coupling mechanism, thereby enabling the movement of the aerodynamic component with respect to the support structure.

10. The aircraft system according to claim 1,
wherein the first coupling unit and the second coupling unit are spaced apart from each other in a spanwise extension direction of the aerodynamic component.

11. The aircraft system according to claim 1,
wherein the aerodynamic component has an airfoil-like cross sectional shape with a chordwise extension direction; and
wherein the first coupling mechanism is arranged in front of the second coupling mechanism with respect to the chordwise extension direction.

12. The aircraft system according to claim 1,
wherein the support structure is a part of a wing structure of an aircraft; and
wherein the aerodynamic component is a trailing edge flap of the aircraft.

13. An aircraft comprising:
a wing structure;
an aircraft system according to claim 1;
wherein the wing structure comprises the support structure to which the aerodynamic component is movably coupled via the first coupling unit and the second coupling unit; and
at least one further coupling unit movably coupling the aerodynamic component to the support structure.

14. The aircraft according to claim 13,
wherein the aerodynamic component is a flap component having a spanwise extension direction;
wherein the first coupling unit is arranged between the second coupling unit and the at least one further coupling unit with respect to the spanwise extension direction.

\* \* \* \* \*